US011880667B2

(12) United States Patent
Xie et al.

(10) Patent No.: US 11,880,667 B2
(45) Date of Patent: Jan. 23, 2024

(54) INFORMATION CONVERSION METHOD AND APPARATUS, STORAGE MEDIUM, AND ELECTRONIC APPARATUS

(71) Applicant: Tencent Technology (Shenzhen) Company Limited, Shenzhen (CN)

(72) Inventors: Jun Xie, Shenzhen (CN); Mingxuan Wang, Shenzhen (CN); Jiangquan Huang, Shenzhen (CN); Jian Yao, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 286 days.

(21) Appl. No.: 16/881,310

(22) Filed: May 22, 2020

(65) Prior Publication Data

US 2020/0285816 A1    Sep. 10, 2020

Related U.S. Application Data

(63) Continuation of application No. PCT/CN2019/072973, filed on Jan. 24, 2019.

(30) Foreign Application Priority Data

Jan. 25, 2018   (CN) .......................... 201810073579.2

(51) Int. Cl.
 *G06F 40/58*    (2020.01)
(52) U.S. Cl.
 CPC .................... *G06F 40/58* (2020.01)
(58) Field of Classification Search
 CPC ........... G06F 40/58; G06F 40/30; G06F 40/12
 See application file for complete search history.

(56) References Cited

U.S. PATENT DOCUMENTS

| 8,868,430 | B2 | 10/2014 | Burvall et al. |
| 2006/0020473 | A1* | 1/2006 | Hiroe .................... G10L 13/027 704/275 |

(Continued)

FOREIGN PATENT DOCUMENTS

| CN | 101131690 A | 2/2008 |
| CN | 104391842 A | 3/2015 |

(Continued)

OTHER PUBLICATIONS

International Search Report for PCT Application No. PCT/CN2019/072973 dated Apr. 29, 2019; 11 pages.

(Continued)

*Primary Examiner* — Michelle M Koeth
*Assistant Examiner* — Paul J. Mueller
(74) *Attorney, Agent, or Firm* — Crowell & Moring LLP

(57) ABSTRACT

This application discloses an information conversion method and apparatus, a storage medium, and an electronic apparatus. The method includes: acquiring, by a hardware device, a source information vector sequence corresponding to source information to be converted; sequentially determining, by the hardware device according to the source information vector sequence and historical conversion result information, a target source information object needing to be converted; searching, by the hardware device, a preconfigured mapping list for a target source information object combination included in the source information; acquiring, by the hardware device, target combination conversion result information corresponding to the target source information object combination from the preconfigured mapping list in a case that the target source information object combination is found; and acquiring, by the hardware device according to the target combination conversion result information, target conversion result information corresponding (Continued)

to the target source information object. This application resolves a technical problem of relatively low flexibility of information conversion in the related art.

20 Claims, 5 Drawing Sheets

(56) References Cited

U.S. PATENT DOCUMENTS

| | | | |
|---|---|---|---|
| 2008/0249998 A1* | 10/2008 | Dettinger | G06F 16/248 |
| 2012/0101804 A1* | 4/2012 | Roth | G06F 40/45 |
| | | | 704/2 |
| 2013/0080370 A1* | 3/2013 | Zadeh | G06V 10/443 |
| | | | 706/47 |
| 2014/0067769 A1 | 3/2014 | Sugawara | |
| 2014/0350914 A1 | 11/2014 | Andrade Silva et al. | |
| 2016/0352656 A1* | 12/2016 | Galley | H04L 51/02 |
| 2018/0329884 A1* | 11/2018 | Xiong | G06N 3/0454 |
| 2019/0122106 A1* | 4/2019 | Lee | G06N 3/063 |
| 2021/0271970 A1* | 9/2021 | Bello | G06N 3/08 |

FOREIGN PATENT DOCUMENTS

| | | |
|---|---|---|
| CN | 104508658 A | 4/2015 |
| CN | 105760372 A | 7/2016 |
| CN | 105893574 A | 8/2016 |
| CN | 107229616 A | 10/2017 |
| CN | 107305549 A | 10/2017 |
| CN | 108427671 A | 8/2018 |

OTHER PUBLICATIONS

Office Action for Chinese Patent Application No. 201810073579.2 with English Concise Explanation of Relevance dated Jan. 15, 2021; 7 pages.

Jin Xu, "Cognitive mapping and reduction mapping in Chinese-English translation", Exam Weekly, vol. 39, Published Dec. 30, 2009, 6 pages.

* cited by examiner

| Mapping list | |
|---|---|
| A g | Y1 Y07 |
| A Bb f | Y1 Y2Y02 Y06 |
| A Bb T | Y1 Y2Y02 Y20/ Y1 Y2Y02 Y Y |
| Bb D | Y2Y02 Y4 |
| A Bb D | Y1 Y2Y02 Y4 |
| A Bb Ddd | Y1 Y2Y02 Y4Y04Y04 |
| A Bb | Y1 Y2Y02 |

INFORMATION CONVERSION METHOD AND APPARATUS, STORAGE MEDIUM, AND ELECTRONIC APPARATUS

RELATED APPLICATION

This application is a continuation application of the International PCT Application No. PCT/CN2019/072973, filed with the Chinese Patent Office on Jan. 24, 2019 which claims priority to Chinese Patent Application No. 2018100735792, filed with the Chinese Patent Office on Jan. 25, 2018 and entitled "INFORMATION CONVERSION METHOD AND APPARATUS, STORAGE MEDIUM, AND ELECTRONIC APPARATUS", which are incorporated herein by reference in their entireties.

FIELD OF THE TECHNOLOGY

This application relates to the field of computers, and specifically, to a method and apparatus, a storage medium, and an electronic apparatus for performing information conversion.

BACKGROUND OF THE DISCLOSURE

Information conversion refers to a process of converting one type of information into another type of information while it is ensured that the original meaning is retained, that is, converting source information into target information by using an information conversion technology. Current common information conversion technologies include: machine translation, for example, conventional Statistical Machine Translation (SMT) and Neural Machine Translation (NMT). During a process of performing information conversion through the NMT, inputted source information is usually encoded into a vector or a vector sequence, and target information is then generated word by word based on the vector or vector sequence that is acquired through encoding.

However, during the process of performing information conversion in the foregoing manner, a completely trained neural network model is usually used. When a translation result needs to be adjusted, it is necessary to acquire a training object again and train a neural network model again. In other words, information conversion manners provided in the related art have a problem that it is difficult to use external resources, and a new mapping relationship required for information conversion cannot be added in real time during an information conversion process, so that information conversion has relatively low flexibility.

For the foregoing problem, no effective solution has been provided at present.

SUMMARY

Embodiments of this application provide a method and apparatus, a storage medium, and an electronic apparatus for performing information conversion, to resolve at least a technical problem of relatively low flexibility in information conversion in the related art.

According to an aspect of the embodiments of this application, an information conversion method is provided. The method includes: acquiring a source information vector sequence corresponding to source information to be converted, the source information vector sequence including: source information object vectors corresponding to source information objects included in the source information; sequentially determining, according to the source information vector sequence and historical conversion result information, a target source information object needing to be converted, the historical conversion result information being conversion result information corresponding to source information objects on which the conversion is completed; searching a preconfigured mapping list for a target source information object combination included in the source information, the target source information object being located at a first target position in the target source information object combination, and the preconfigured mapping list being used for recording mapping relationships between source information object combinations and combination conversion result information; acquiring target combination conversion result information corresponding to the target source information object combination from the preconfigured mapping list if the target source information object combination is found in the preconfigured mapping list; and acquiring, according to the target combination conversion result information, target conversion result information corresponding to the target source information object.

According to another aspect of the embodiments of this application, an information conversion apparatus is further provided. The apparatus includes: a first acquisition unit, configured to acquire a source information vector sequence corresponding to source information to be converted, the source information vector sequence including: source information object vectors corresponding to source information objects included in the source information; a determination unit, configured to sequentially determine, according to the source information vector sequence and historical conversion result information, a target source information object needing to be converted, the historical conversion result information being conversion result information corresponding to source information objects on which conversion is completed; a search unit, configured to search a preconfigured mapping list for a target source information object combination included in the source information, the target source information object being located at a first target position in the target source information object combination, and the preconfigured mapping list being used for recording mapping relationships between source information object combinations and combination conversion result information; a second acquisition unit, configured to acquire target combination conversion result information corresponding to the target source information object combination from the preconfigured mapping list if the target source information object combination is found; and a third acquisition unit, configured to acquire, according to the target combination conversion result information, target conversion result information corresponding to the target source information object.

In one example, a conversion unit includes: a first acquisition module, configured to acquire a target combination length of the target combination conversion result information; a second acquisition module, configured to acquire an intermediate state set matching the target combination length, each intermediate state in the intermediate state set being separately used for controlling the conversion to obtain one piece of conversion result information, the intermediate state set including a first target intermediate state used for controlling the conversion to obtain the target conversion result information, and the first target intermediate state being located at a second target position in the intermediate state set; and a third acquisition module, configured to acquire the target conversion result information by using the first target intermediate state determined from the intermediate state set.

In another example, the conversion unit further includes: a first determination module, configured to determine, after the target conversion result information is acquired by using the first target intermediate state determined from the intermediate state set, a second target intermediate state used for controlling the conversion to obtain next target conversion result information; and a fourth acquisition module, configured to acquire the next target conversion result information according to the target combination conversion result information in a case that the second target intermediate state belongs to the intermediate state set.

In another example, the fourth acquisition module includes: an acquisition submodule, configured to acquire from the target combination conversion result information subsequent to the target conversion result information corresponding to the first target intermediate state, next conversion result information for use as the next target conversion result information corresponding to the second target intermediate state.

In another example, the conversion unit further includes: a first search module, configured to: after the second target intermediate state used for controlling the conversion to obtain the next target conversion result information is determined, search the preconfigured mapping list again for a next target source information object combination in a case that the second target intermediate state does not belong to the intermediate state set, the next target source information object combination including a next target source information object needing to be converted.

In another example, the conversion unit further includes: a fifth acquisition module, configured to: after the second target intermediate state used for controlling the conversion to obtain the next target conversion result information is determined, acquire a quantity of intermediate states on which the first target intermediate state superimposes the second target intermediate state; and a second determination module, configured to: determine that the second target intermediate state belongs to the intermediate state set if the quantity of intermediate states is less than or equal to the target combination length, and determine that the second target intermediate state does not belong to the intermediate state set if the quantity of intermediate states is greater than the target combination length.

In another example, the search unit includes: a sixth acquisition module, configured to acquire, from the preconfigured mapping list according to the target source information object, a source information object combination set included in the source information, the target source information object being located at the first target position in each source information object combination in the source information object combination set; and a second search module, configured to search the source information object combination set for a source information object combination with the largest source combination length to be used as the target source information object combination.

In another example, the first determination unit includes: a seventh acquisition module, configured to acquire previous conversion result information from the historical conversion result information; an eighth acquisition module, configured to acquire a target source information object vector from the source information vector sequence according to the source information vector sequence and the previous conversion result information; and a third determination module, configured to determine the target source information object according to the target source information object vector.

According to still another aspect of the embodiments of this application, a storage medium is further provided. The storage medium stores a computer program, the computer program being configured to perform the foregoing method when being run.

According to still another aspect of the embodiments of this application, an electronic apparatus is further provided. The electronic apparatus includes a memory and a processor, the memory storing a computer program, and the processor being configured to perform the foregoing method by using the computer program.

In the embodiments of this application, a preconfigured mapping list is searched for target combination conversion result information corresponding to a target source information object combination included in source information, so the preconfigured mapping list from outside is utilized during the information conversion process. The mapping relationships between source information object combinations and combination conversion result information recorded in the preconfigured mapping list is used to intervene in and adjust information conversion on the source information. Therefore, a quick adjustment can be implemented by introducing a preconfigured mapping list from outside, and it is no longer necessary to spend a lot of time and computing resources to train a neural network model required for information conversion again. Furthermore, since the update on the preconfigured mapping list is fast and easy without the lengthy re-training process, this method improves the flexibility of information conversion and resolves the technical problem of relatively low flexibility in information conversion in the related art.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments acquired by a person of ordinary skill in the art based on the embodiments of this application without creative efforts shall fall within the protection scope of this application.

The terms such as "first", "second", and the like in the specification, claims of this application, and the foregoing accompanying drawings of this application that are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
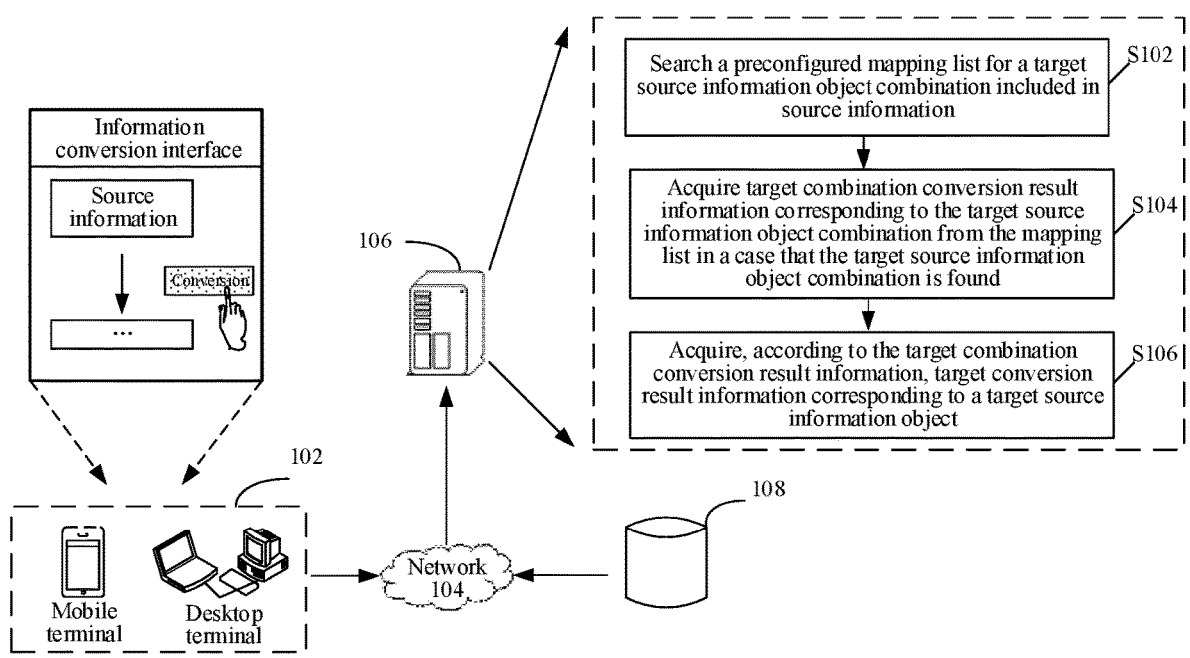
FIG. 1 is a schematic diagram of an exemplary application environment of an information conversion method according to an embodiment of this application.

In the embodiments of this application, an embodiment of the foregoing information conversion method is provided. In an optional implementation, the information conversion method may be applied to, but is not limited to, an application environment shown in FIG. 1. Source information to be converted is acquired through an information conversion interface of a user terminal 102 (such as a mobile terminal or a desktop terminal), and the source information is transmitted, through a network 104, to a hardware device 106 configured to perform information conversion. The hardware device 106 acquires a source information vector sequence corresponding to the source information, the source information vector sequence including source information object vectors corresponding to source information objects included in the source information, and sequentially determines, according to the acquired source information vector sequence and historical conversion result information, a target source information object needing to be converted. The hardware device 106 then performs step S102 to step S106: acquiring, from a database 108, a mapping list used for recording mapping relationships between source information object combinations and combination conversion result information, and searching the preconfigured mapping list for a target source information object combination included in the source information, the target source information object being located at a first target position in the target source information object combination; acquiring target combination conversion result information corresponding to the target source information object combination from the preconfigured mapping list in a case that the target source information object combination is found; and acquiring, according to the target combination conversion result information, target conversion result information corresponding to the target source information object.

In this embodiment, after a source information vector sequence corresponding to source information is acquired, a target source information object needing to be converted is determined according to the source information vector sequence and historical conversion result information on which conversion is completed; a preconfigured mapping list is then used to search for a target source information object combination included in the source information, the target source information object being located at a first target position in the target source information object combination; and target combination conversion result information corresponding to the target source information object combination is acquired from the preconfigured mapping list if the target source information object combination is found, so as to acquire target conversion result information corresponding to the target source information object by using the target combination conversion result information. In other words, a preconfigured mapping list is searched for target combination conversion result information corresponding to a target source information object combination included in source information, so that the preconfigured mapping list from outside is utilized during the information conversion process. The mapping relationships between source information object combinations and combination conversion result information recorded in the preconfigured mapping list is used to intervene and adjust information conversion on the source information. Therefore, a quick adjustment can be implemented by introducing a preconfigured mapping list from outside, and it is no longer necessary to spend a lot of time and computing resources to train a neural network model required for information conversion again. Furthermore, since the update on the preconfigured mapping list is fast and easy without the lengthy re-training process, and information conversion is implemented by searching a preconfigured mapping list for a recorded mapping relationship, the duration required for conversion can further be greatly shortened and this method improves the flexibility of information conversion.

Optionally, in this embodiment, the user terminal may include, but is not limited to, a mobile terminal such as a mobile phone or a tablet computer, a notebook computer, a desktop terminal such as a desktop personal computer (PC) or a digital television, or another hardware device configured to implement information conversion. The network may include, but is not limited to, at least one of the following: a wide area network, a metropolitan area network or a local area network. The foregoing description is merely an example, and is not meant to be limited in this embodiment in any manner.

Figure 2:
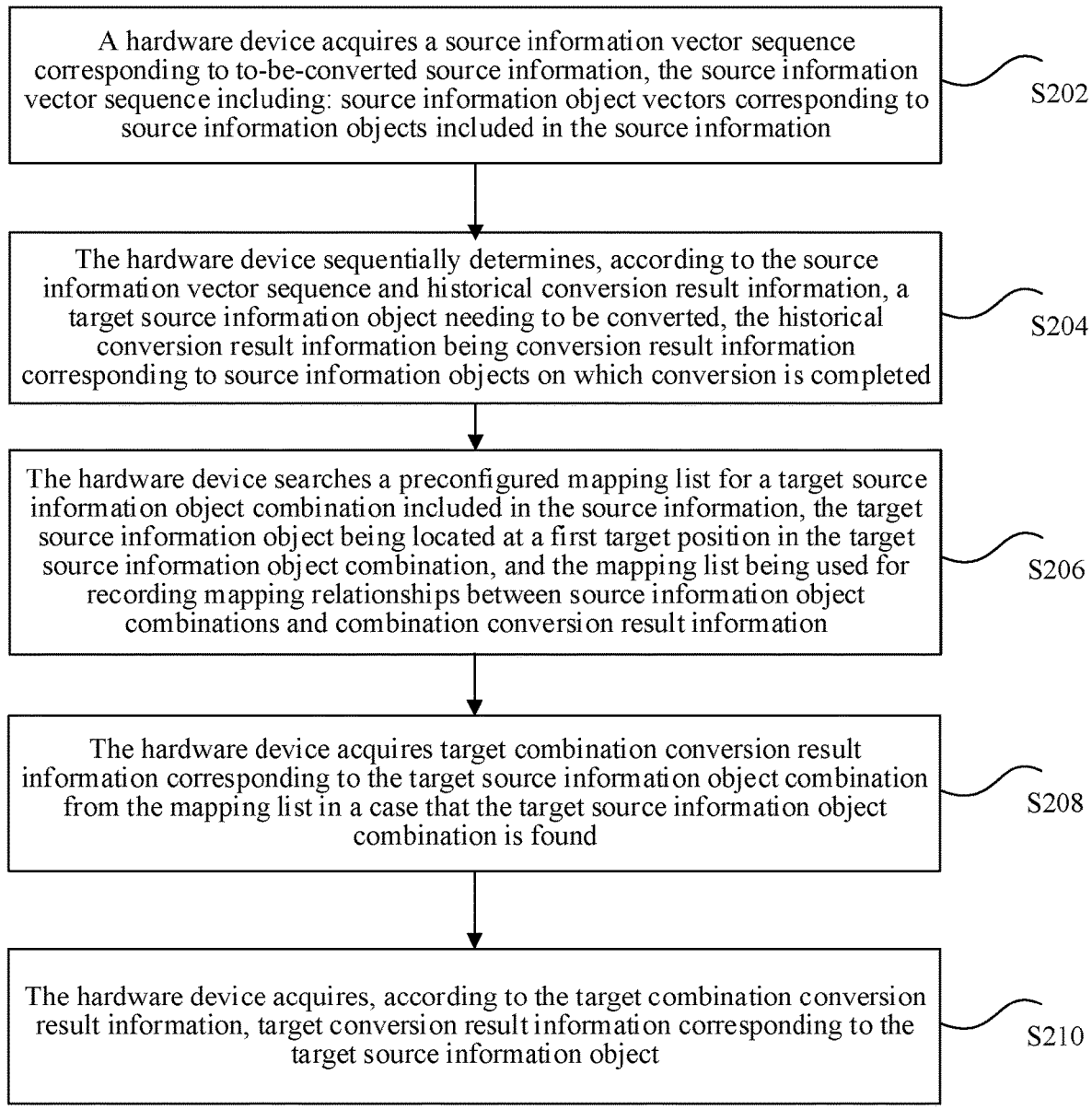
FIG. 2 is a flowchart of an exemplary information conversion method according to an embodiment of this application.

According to an aspect of the embodiments of this application, an information conversion method is provided. As shown in FIG. 2, the method includes the following steps:

S202. A hardware device acquires a source information vector sequence corresponding to source information to be converted, the source information vector sequence including: source information object vectors corresponding to source information objects included in the source information.

S204. The hardware device sequentially determines, according to the source information vector sequence and historical conversion result information, a target source information object needing to be converted, the historical conversion result information being conversion result information corresponding to source information objects on which conversion is completed.

S206. The hardware device searches a preconfigured mapping list for a target source information object combination included in the source information, the target source information object being located at a first target position in the target source information object combination, and the preconfigured mapping list being used for recording mapping relationships between source information object combinations and combination conversion result information.

S208. The hardware device acquires target combination conversion result information corresponding to the target source information object combination from the preconfigured mapping list in a case that the target source information object combination is found.

S210. The hardware device acquires, according to the target combination conversion result information, target conversion result information corresponding to the target source information object.

Optionally, in this embodiment, the foregoing information conversion method may be, but is not limited to, implemented by combining NMT. In addition, the information conversion method may be applied to, but is not limited to, a process of converting one type of information into another type of information while the original meaning is retained. The information conversion may include, but is not limited to, conversion of information representation manners, conversion of information formats or the like. For example, information translation includes: (1) literary translation, that is, conversion of abstract or hard to understand text information in literary works into more comprehensible vernacular text information; (2) language translation, that is, conversion of text information in one language (for example, Chinese text information) into text information in another language (for example, English text information); (3) speech translation, that is, conversion of speech information in an audio format into text information in a text format; and the like. The foregoing application scenarios are merely examples. The information conversion method provided in this embodiment may also be applied to, but is not limited to, another information conversion scenario, and is not limited in any manner in this embodiment.

In this embodiment, when a target source information object needing to be converted in source information is determined according to an acquired source information vector sequence corresponding to the source information and historical conversion result information, the hardware device introduces a preconfigured mapping list, and searches the preconfigured mapping list for target combination conversion result information corresponding to a target source information object combination included in the source information, the target source information object being located at a first target position in the target source information object combination, so as to implement the introduction of a mapping list into an information conversion process from outside, thereby using mapping relationships between source information object combinations and combination conversion result information recorded in the preconfigured mapping list to intervene in and adjust information conversion on the source information. A quick adjustment can be implemented by introducing a preconfigured mapping list from outside, and it is no longer necessary to train a neural network model required for information conversion again, thus achieving the effects of updating to new mapping relationship required for information conversion quickly and improving the flexibility of information conversion. Information conversion is implemented by searching a mapping list for a recorded mapping relationship, so that the duration required for conversion can further be greatly shortened, thereby achieving the effect of improving the efficiency of information conversion.

Optionally, in this embodiment, the source information to be converted may include, but is not limited to, one or more source information objects, and the source information object may be, but is not limited to, an object such as a word having the smallest unit with a complete meaning. The source information vector sequence corresponding to the source information may include, but is not limited to, source information object vectors corresponding to the source information objects. For example, a word is converted into a machine-recognizable word vector.

In addition, in this embodiment, the source information may further include, but is not limited to, one or more source information object combinations, and each source information object combination may include, but is not limited to, one or more source information objects, for example, a phrase or a technical term obtained through combination.

Use text translation as an example. It is assumed that the source information indicates a to-be-translated text "A Bb Ddd". The source information objects included in the source information indicate letters in the to-be-translated text, and may be, for example, a source information object "A", a source information object "B", a source information object "b", a source information object "D", or a source information object "d". The source information object combination may be a phrase including the letters, and may be, for example, a source information object combination of "Bb", a source information object combination of "Ddd", or a source information object combination of "Bb Ddd". The foregoing description is merely an example, and is not meant to be limited in this embodiment in any manner.

Optionally, in this embodiment, the preconfigured mapping list may be used for, but is not limited to, recording mapping relationships between the source information object combinations and the combination conversion result information. The preconfigured mapping list may include, but is not limited to, one or more pieces of combination conversion result information corresponding to the target source information object combination needing to be searched for, the target source information object being located at a first target position in the target source information object combination needing to be searched for.

Optionally, in this embodiment, manners of determining the target source information object combination may include, but are not limited to: acquiring, by a hardware device from the source information, source information object combinations with the target source information object as the first object; searching the preconfigured mapping list in an ascending order of combination lengths of the acquired source information object combinations; if combination conversion result information corresponding to a source information object combination with a combination length of i+1 is not found, acquiring a source information object combination with a combination length of i and continuing with the search; and if combination conversion result information corresponding to the source information object combination with the combination length of i is found, using the source information object combination with the combination length of i as the target source information object combination, and using the found combination conversion result information as target combination conversion result information, where i is a natural number greater than 1.

Optionally, in this embodiment, the target source information object may be, but is not limited to, being determined by the hardware device according to an inputted source information object vector sequence and historical conversion result information on which conversion is completed. For example, the hardware device acquires, according to the historical conversion result information, a hidden state Ht of a previous source information object on which conversion is completed, determines, according to the hidden state Ht and the source information object vector sequence, a hidden state H(t+1) corresponding to a target source information object currently needing to be converted, and then determines the target source information object according to the hidden state H(t+1).

Figure 3:
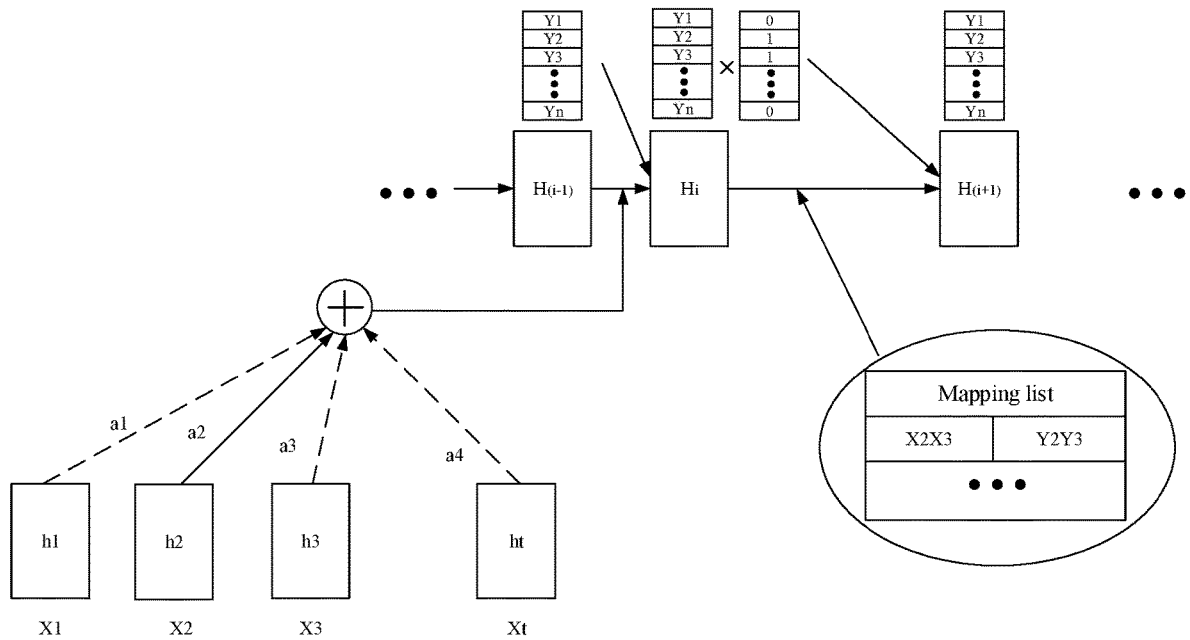
FIG. 3 is a schematic diagram of an exemplary information conversion method according to an embodiment of this application.

Specifically, descriptions are provided with reference to FIG. 3. Assuming that an acquired source information vector sequence corresponding to source information to be converted is: X1X2X3 . . . Xt, a hidden state Hi corresponding to a target source information object currently needing to be converted is determined according to the source information vector sequence and a hidden state H(i−1) of a previous source information object on which conversion is completed, and a target source information object is determined, according to the hidden state Hi, as a source information object corresponding to a vector X2. The preconfigured mapping list is searched for target source information object combinations included in the source information. Assuming that a found target source information object combination with the largest combination length is X2X3, and an acquired corresponding target combination conversion result information is Y2Y3, the hidden state Hi corresponding to the target source information object may be intervened in according to the target combination conversion result information of Y2Y3, so that a conversion result of the target source information object X2 is Y2 which is obtained according to the target combination conversion result information of Y2Y3.

The foregoing steps are repeated until the information conversion process of the source information is completed.

During a process of repeating the foregoing steps, if a combination length of the target combination conversion result information is m (m>1), it means that the target combination conversion result information generates an intervention effect on m hidden states in the conversion process. For example, assuming that the hidden state Hi is the first hidden state of the m hidden states, during the conversion process according to a hidden state H(i+1), the hardware device may, but is not limited to, block conversion result information that is predicted by repeating the foregoing steps corresponding to the hidden state H(i+1). Instead, the found target combination conversion result information of Y2Y3 may be directly used to obtain conversion result information of Y3 corresponding to the hidden state H(i+1).

In addition, during an information conversion process, a conversion result information set corresponding to each hidden state may include, but is not limited to, a plurality of pieces of conversion result information of Y1 to Yn shown in FIG. 3. In this embodiment, the hardware device may, but is not limited to, acquire the target conversion result information from the conversion result information set by configuring a corresponding weight. For example, assuming that target conversion result information currently needing to be acquired is "Y2", a weight 1 may be configured for "Y2", and a weight 0 may be configured for other conversion result information. Alternatively, a weight a may be configured for "Y2", and a weight b may be configured for other conversion result information, where a>b.

In this embodiment, in the case that a target source information object needing to be converted in source information is determined according to an acquired source information vector sequence corresponding to the source information and historical conversion result information, the hardware device introduces a preconfigured mapping list, and searches the preconfigured mapping list for target combination conversion result information corresponding to a target source information object combination included in the source information, the target source information object being located at a first target position in the target source information object combination. In this embodiment, the preconfigured mapping list from outside is utilized during the information conversion process. The mapping relationships between source information object combinations and combination conversion result information recorded in the preconfigured mapping list is used to intervene in and adjust information conversion on the source information. Therefore, a quick adjustment can be implemented by introducing a preconfigured mapping list from outside and it is no longer necessary to spend a lot of time and computing resources to train a neural network model required for information conversion again. Furthermore, since the update on the preconfigured mapping list is fast and easy without the lengthy re-training process, this method improves the flexibility of information conversion and resolves the technical problem of relatively low flexibility in information conversion in the related art.

In an optional solution, that the hardware device acquires, according to the target combination conversion result information, target conversion result information corresponding to the target source information object includes:

S1: acquiring, by the hardware device, a target combination length of the target combination conversion result information;

S2: acquiring, by the hardware device, an intermediate state set matching the target combination length, each intermediate state in the intermediate state set being separately used for controlling the conversion to obtain one piece of conversion result information, the intermediate state set including a first target intermediate state used for controlling the conversion to obtain the target conversion result information, and the first target intermediate state being located at a second target position in the intermediate state set; and S3: acquiring, by the hardware device, the target conversion result information by using the first target intermediate state determined from the intermediate state set.

Optionally, in this embodiment, the target combination length may be, but is not limited to, a result length of target combination conversion result information after conversion. For example, conversion of text information is used as an example. The combination length may be, but is not limited to, a quantity of words in a phrase. The foregoing description is merely an example, and is not meant to be limited in this embodiment in any manner.

Figure 4:
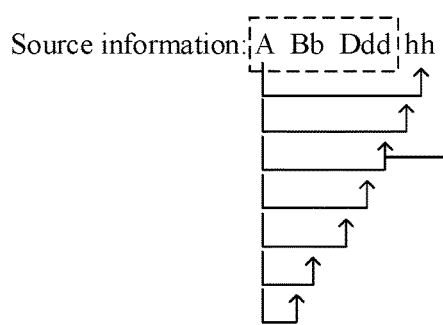
FIG. 4 is a schematic diagram of another exemplary information conversion method according to an embodiment of this application.

The target combination length of the target combination conversion result information may be the same as a combination length of a source information object combination. For example, as shown in FIG. 4, a source information object combination of "A g" which has two words corresponds to a target combination conversion result information "Y1 Y07", which also has two words. On the other hand, the target combination length of the target combination conversion result information may be different from a combination length of a source information object combination. For example, as shown in FIG. 4, a source information object combination of "A Bb T" which has four words may correspond to a target combination conversion result information "Y2Y02 Y20", which has four words, or a target combination conversion result information "Y1 Y2Y02 Y Y", which has five words. There is no limitation in any manner in this embodiment.

Specifically, descriptions are provided with reference to FIG. 4. Assuming that the source information to be converted is "A Bb Ddd hh", the hardware device finds, in the preconfigured mapping list, target combination conversion result information of "Y1 Y2Y02 Y4 Y04Y04" corresponding to a target source information object combination of "A Bb Ddd", where a target combination length indicates that a quantity of words is 6, an intermediate state set matching the target combination length may then be acquired. According to the foregoing example, an intermediate state set may include 6 intermediate states (also referred to as hidden states), and may include: Hi, H(i+1), H(i+2), H(i+3), H(i+4), and H(i+5).

The second target position and the first target position may indicate positions in the same order. For example, assuming that a currently determined target source information object is "A", the target source information object "A" being located at a position of the first object in a target source information object combination, then the first target intermediate state may correspond to the hidden state Hi which is also located at a first position of the intermediate state set.

In other words, from the hidden state Hi to the hidden state H(i+5), during the information conversion process, information conversions can all be performed according to target combination conversion result information of "Y1 Y2Y02 Y4 Y04Y04" which is found while performing the hidden state Hi conversion, and a prediction result that is based on a neural network model is blocked. A result obtained through machine translation by the neural network model is used together with the preconfigured mapping list and is no longer used separately.

The hardware device determines from the intermediate state set that the first target intermediate state is the hidden state Hi, and correspondingly determines that the target conversion result information is "Y1", which is in the target combination conversion result information "Y1 Y2Y02 Y4 Y04Y04".

In this embodiment provided by this application, a hardware device controls overall information conversion of a source information object combination by using a target combination length of found target combination conversion result information, so as to implement intervention during an information conversion process by using a preconfigured mapping list, to directly acquire the target combination conversion result information through searching the preconfigured mapping list and reduce the additional time required for repeated training of a neural network model in the information conversion process, thus achieving the effect of improving the speed and efficiency of information conversion.

In an optional solution, after the acquiring, by the hardware device, the target conversion result information by using the first target intermediate state determined from the intermediate state set, the method further includes:
- S1: determining, by the hardware device, a second target intermediate state used for controlling the conversion to obtain next target conversion result information; and
- S2: acquiring, by the hardware device, the next target conversion result information according to the target combination conversion result information if the second target intermediate state belongs to the intermediate state set.

Optionally, in this embodiment, the acquiring, by the hardware device, the next target conversion result information according to the target combination conversion result information if the second target intermediate state belongs to the intermediate state set includes: acquiring, by the hardware device, from the target combination conversion result information subsequent to the target conversion result information corresponding to the first target intermediate state, next conversion result information to be used as the next target conversion result information corresponding to the second target intermediate state.

Specifically, descriptions are provided with reference to FIG. 3. Assuming that conversion on a target source information object corresponding to the first target intermediate state (for example, the hidden state Hi) is completed, the hardware device acquires a next intermediate state, that is, the second target intermediate state (for example, the hidden state H(i+1)), and determines whether the hidden state H(i+1) belongs to the intermediate state set. It can be learned from the foregoing example that if the hidden state H(i+1) belongs to the intermediate state set, next conversion result information can then be acquired from the target combination conversion result information of "Y1 Y2Y02 Y4 Y04Y04" subsequent to the target conversion result information (for example, "Y1") corresponding to the first target intermediate state (for example, the hidden state Hi) to be used as the next target conversion result information, for example, "Y2", corresponding to the second target intermediate state (for example, the hidden state H(i+1)).

The manners of determining, by the hardware device, whether the second target intermediate state belongs to the intermediate state set may include, but are not limited to: counting, by the hardware device from the first target intermediate state, intermediate states used in subsequent conversion, and if a counting result does not reach a quantity of intermediate states included in the intermediate state set, the hardware device may directly use target combination conversion result information that is found from the preconfigured mapping list to complete information conversion, and if a counting result exceeds a quantity of intermediate states included in the intermediate state set, the hardware device repeats steps of performing search and conversion according to the foregoing embodiment.

Optionally, in this embodiment, that if a counting result exceeds a quantity of intermediate states included in the intermediate state set, the hardware device performs again steps of performing search and conversion according to the foregoing embodiment may include, but is not limited to, after the second target intermediate state used for controlling the conversion to obtain the next target conversion result information is determined in a case that the second target intermediate state does not belong to the intermediate state set, searching, by the hardware device, the preconfigured mapping list again for a next target source information object combination, the next target source information object combination including a next target source information object needing to be converted.

In other words, if the second target intermediate state does not belong to the intermediate state set, the hardware device may, but is not limited to, search the preconfigured mapping list again for the target combination conversion result information according to the method described in the foregoing embodiment, to continue with the information conversion process, until conversion on the source information is completed.

In this embodiment, based on a determination result about whether the next intermediate state belongs to the intermediate state set, the hardware device further determines whether to use target combination conversion result information that is found from the preconfigured mapping list directly to complete information conversion, thus achieving the effect of improving the speed and efficiency of information conversion.

In an optional solution, after the determining, by the hardware device, a second target intermediate state used for controlling the conversion to obtain next target conversion result information, the method further includes:

S1: acquiring, by the hardware device, a quantity of intermediate states on which the first target intermediate state superimposes the second target intermediate state;

S2: determining, by the hardware device, that the second target intermediate state belongs to the intermediate state set if the quantity of intermediate states is less than or equal to the target combination length; and S3: determining, by the hardware device, that the second target intermediate state does not belong to the intermediate state set if the quantity of intermediate states is greater than the target combination length.

Optionally, in this embodiment, the hardware device may be, but is not limited to, counting, from the first target intermediate state, a number of intermediate states used in subsequent conversion, to determine whether the second target intermediate state belongs to the intermediate state set.

Specifically, descriptions are provided with reference to the following example. The hardware device counts the intermediate states, assuming that a quantity of intermediate states after the second target intermediate state is superposed is T. Further, it is also assumed that the target combination length is 6. If the quantity T of intermediate states is less than or equal to 6, it indicates that the second target intermediate state belongs to the intermediate state set, so that the target combination conversion result information found in a previous time can be directly used to perform information conversion. If the quantity T of intermediate states is greater than 6, it indicates that the second target intermediate state does not belong to the intermediate state set, and the steps of performing search and conversion need to be repeated.

In this embodiment provided in this application, the hardware device counts the intermediate states, so that target combination conversion result information is accurately used to perform information conversion on the source information object combination, thereby avoiding a conversion error.

In an optional solution, the searching, by the hardware device, a preconfigured mapping list for a target source information object combination included in the source information includes:

S1: acquiring, by the hardware device from the preconfigured mapping list according to the target source information object, a source information object combination set included in the source information, the target source information object being located at the first target position in each source information object combination in the source information object combination set; and S2: searching, by the hardware device, the source information object combination set for a source information object combination with the largest source combination length to be used as the target source information object combination.

Specifically, descriptions are provided with reference to FIG. 4. Assuming that the source information to be converted is "A Bb Ddd hh", the preconfigured mapping list is searched for a source information object combination set using a target source information object "A" as the first object. If a found source information object combination set includes: "A Bb D", "A Bb Ddd", and "A Bb", where a source information object combination having the largest source combination length is "A Bb Ddd", then "A Bb Ddd" may be used as the target source information object combination.

In this embodiment provided in this application, the hardware device searches the source information object combination set for the source information object combination with the largest source combination length, the target source information object being located at the first target position in each source information object combination of the source information object combination set, thus using as much as possible mapping relationships already recorded in the preconfigured mapping list to complete information conversion and reduce the duration for machine translation by a neural network model, therefore achieving the object of improving the efficiency and the speed of information conversion.

In an optional solution, the determining, by the hardware device according to the source information vector sequence and historical conversion result information, a target source information object needing to be converted includes:

S1: acquiring, by the hardware device, previous conversion result information from the historical conversion result information;

S2: acquiring, by the hardware device, a target source information object vector from the source information vector sequence according to the source information vector sequence and the previous conversion result information; and S3: determining, by the hardware device, the target source information object according to the target source information object vector.

Specifically, descriptions are provided with reference to FIG. 3. Assuming that a source information vector sequence that is acquired by the hardware device and corresponds to source information to be converted is: X1X2X3 . . . Xt, it is then determined, according to the source information vector sequence and a hidden state $H(i-1)$ of a previous source information object on which conversion is completed, that a weight a2 corresponding to a source information object vector X2 has the greatest weight impact on a hidden state Hi corresponding to the target source information object currently needing to be converted. Therefore, it can be predicted that the target source information object is a source information object corresponding to the vector X2.

In this embodiment, according to the source information vector sequence and previous conversion result information, the hardware device can accurately predict, from the source information vector sequence corresponding to the source information, a target source information vector needing to be acquired. The target source information object is then determined according to the target source information vector.

For brief description, the foregoing method embodiments are represented as a series of action combinations. However, a person skilled in the art shall appreciate that this application is not limited to the described order of the actions, because according to this application, some steps may be performed in other orders or simultaneously. Additionally, a person skilled in the art shall know that the embodiments described in the specification all belong to optional embodiments and the related actions and modules may not be mandatory for this application.

Figure 5:
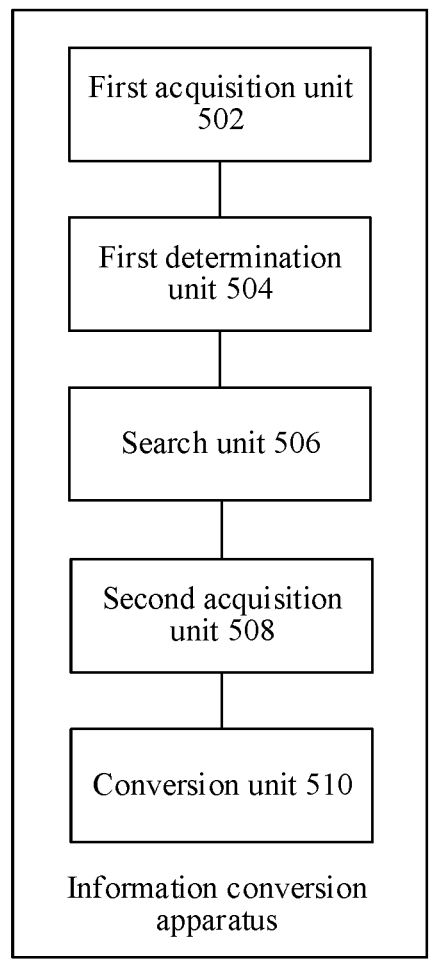
FIG. 5 is a schematic diagram of an exemplary information conversion apparatus according to an embodiment of this application.

According to another aspect of the embodiments of this application, an information conversion apparatus configured to implement the information conversion method is further provided. The apparatus is applied to a hardware device. As shown in FIG. 5, the apparatus includes:

(1) a first acquisition unit 502, configured to acquire a source information vector sequence corresponding to source information to be converted, the source information vector sequence including: source information object vectors corresponding to source information objects included in the source information;

(2) a first determination unit 504, configured to sequentially determine, according to the source information vector sequence and historical conversion result information, a target source information object needing to be converted, the historical conversion result information being conversion result information corresponding to source information objects on which conversion is completed;

(3) a search unit 506, configured to search a preconfigured mapping list for a target source information object combination included in the source information, the target source information object being located at a first target position in the target source information object combination, and the preconfigured mapping list being used for recording mapping relationships between source information object combinations and combination conversion result information;

(4) a second acquisition unit 508, configured to acquire target combination conversion result information corresponding to the target source information object combination from the preconfigured mapping list if the target source information object combination is found; and (5) a conversion unit 510, configured to acquire, according to the target combination conversion result information, target conversion result information corresponding to the target source information object.

Optionally, in this embodiment, the foregoing information conversion apparatus may be, but is not limited to, implemented by combining NMT. In addition, the information conversion method may be applied to, but is not limited to, a process of converting one type of information into another type of information while the original meaning is retained. The information conversion may include, but is not limited to, conversion of information representation manners, conversion of information formats or the like. For example, information translation includes: (1) literary translation, that is, conversion of abstract or hard to understand text information in literary works into more comprehensible vernacular text information; (2) language translation, that is, conversion of text information in one language (for example, Chinese text information) into text information in another language (for example, English text information); (3) speech translation, that is, conversion of speech information in an audio format into text information in a text format; and the like. The foregoing application scenarios are merely examples. The information conversion method provided in this embodiment may also be applied to, but is not limited to, another information conversion scenario, and is not limited in any manner in this embodiment.

In this embodiment, when a target source information object needing to be converted in source information is determined according to an acquired source information vector sequence corresponding to the source information and historical conversion result information, a preconfigured mapping list is introduced, and the preconfigured mapping list is searched for target combination conversion result information corresponding to a target source information object combination included in the source information, the target source information object being located at a first target position in the target source information object combination, so as to implement the introduction of a mapping list into an information conversion process from outside, thereby using mapping relationships between source information object combinations and combination conversion result information recorded in the preconfigured mapping list to intervene in and adjust information conversion on the source information. A Quick adjustment can be implemented by introducing a preconfigured mapping list from outside, and it is no longer necessary to train a neural network model required for information conversion again, thus achieving the effects of updating to a new mapping relationship required for information conversion quickly and improving the flexibility of information conversion. Information conversion is implemented by searching a mapping list for a recorded mapping relationship, so that the duration required for conversion can further be greatly shortened, thereby achieving the effect of improving the efficiency of information conversion.

Optionally, in this embodiment, the source information to be converted may include, but is not limited to, one or more source information objects, and the source information object may be, but is not limited to, an object such as a word having the smallest unit with a complete meaning. The source information vector sequence corresponding to the source information may include, but is not limited to, source information object vectors corresponding to the source information objects. For example, a word is converted into a machine-recognizable word vector.

In addition, in this embodiment, the source information may further include, but is not limited to, one or more source information object combinations, and each source information object combination may include, but is not limited to, one or more source information objects, for example, a phrase or a technical term obtained through combination.

Use text translation as an example. It is assumed that the source information indicates a to-be-translated text "A Bb Ddd". The source information objects included in the source information indicate letters in the to-be-translated text, and may be, for example, a source information object "A", a source information object "B", a source information object "b", a source information object "D", or a source information object "d". The source information object combination may be a phrase including the letters, and may be, for example, a source information object combination of "Bb", a source information object combination of "Ddd", or a source information object combination of "Bb Ddd". The foregoing description is merely an example, and is not meant to be limited in this embodiment in any manner.

Optionally, in this embodiment, the preconfigured mapping list may be used for, but is not limited to, recording mapping relationships between the source information object combinations and the combination conversion result information. The preconfigured mapping list may include, but is not limited to, one or more pieces of combination conversion result information corresponding to the target source information object combination needing to be searched for, the target source information object being located at a first target position in the target source information object combination needing to be searched for.

Optionally, in this embodiment, manners of determining the target source information object combination may include, but is not limited to: acquiring, from the source information, source information object combinations with the target source information object as the first object; searching the preconfigured mapping list in an ascending order of combination lengths of the acquired source information object combinations; if combination conversion result information corresponding to a source information object combination with a combination length of i+1 is not found, acquiring a source information object combination with a combination length of i and continuing with the search; and if combination conversion result information corresponding to the source information object combination with the combination length of i is found, using the source information object combination with the combination length of i as the target source information object combination, and using the found combination conversion result information as target combination conversion result information, where i is a natural number greater than 1.

Optionally, in this embodiment, the target source information object may be, but is not limited to, being determined according to an inputted source information object vector sequence and historical conversion result information on which conversion is completed. For example, a hidden state Ht of a previous source information object on which conversion is completed is acquired according to the historical conversion result information, and a hidden state H(t+1) corresponding to a target source information object currently needing to be converted is determined according to the hidden state Ht and the source information object vector sequence, so as to determine the target source information object according to the hidden state H(t+1).

Specifically, descriptions are provided with reference to FIG. 3. Assuming that an acquired source information vector sequence corresponding to source information to be converted is: X1X2X3 . . . Xt, a hidden state Hi corresponding to a target source information object currently needing to be converted is determined according to the source information vector sequence and a hidden state H(i−1) of a previous source information object on which conversion is completed, and a target source information object is determined, according to the hidden state Hi, as a source information object corresponding to a vector X2. The preconfigured mapping list is searched for target source information object combinations included in the source information. Assuming that a found target source information object combination with the largest combination length of X2X3, and an acquired corresponding target combination conversion result information is Y2Y3, the hidden state Hi corresponding to the target source information object may be intervened in according to the target combination conversion result information of Y2Y3, so that a conversion result of the target source information object X2 is Y2 which is obtained according to the target combination conversion result information of Y2Y3.

The foregoing steps are repeated until the information conversion process of the source information is completed.

During process of repeating the foregoing steps, if a combination length of the target combination conversion result information is m (m>1), it means that the target combination conversion result information will be used to generate an intervention effect on m hidden states in the conversion process. For example, assuming that the hidden state Hi is the first hidden state of the m hidden states, during the conversion process according to a hidden state H(i+1), the information conversion apparatus may, but is not limited to, block conversion result information that is predicted by repeating the foregoing steps corresponding to the hidden state H(i+1). Instead, the found target combination conversion result information of Y2Y3 may be directly used to obtain conversion result information of Y3 corresponding to the hidden state H(i+1).

In addition, during an information conversion process, a conversion result information set corresponding to each hidden state may include, but is not limited to, a plurality of pieces of conversion result information of Y1 to Yn shown in FIG. 3. This embodiment may, but is not limited to, acquire the target conversion result information from the conversion result information set by configuring a corresponding weight. For example, assuming that target conversion result information currently needing to be acquired is "Y2", a weight 1 may be configured for "Y2", and a weight 0 may be configured for other conversion result information. Alternatively, a weight a may be configured for "Y2", and a weight b may be configured for other conversion result information, where a>b.

In this embodiment provided in this application, in a case that a target source information object needing to be converted in source information is determined according to an acquired source information vector sequence corresponding to the source information and historical conversion result information, a preconfigured mapping list is introduced, and the preconfigured mapping list is searched for target combination conversion result information corresponding to a target source information object combination included in the source information, the target source information object being located at a first target position in the target source information object combination, so as to implement the introduction of a preconfigured mapping list into an information conversion process from outside, thereby using mapping relationships between source information object combinations and combination conversion result information recorded in the preconfigured mapping list to intervene in and adjust information conversion on the source information. A quick adjustment can be implemented by introducing a preconfigured mapping list from outside, and it is no longer necessary to spend a lot of time and computing resources to train a neural network model required for information conversion again, thus achieving the effects of updating to a new mapping relationship required for information conversion quickly and improving the flexibility of information conversion.

Figure 6:
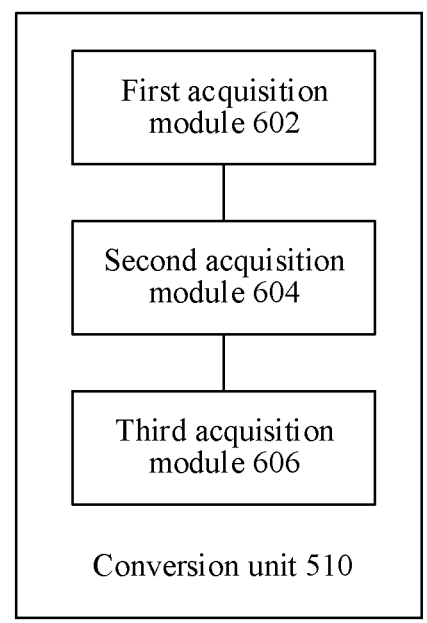
FIG. 6 is a schematic diagram of a conversion unit in an exemplary information conversion apparatus according to an embodiment of this application.

In an optional solution, as shown in FIG. 6, the conversion unit 510 includes:

(1) a first acquisition module 602, configured to acquire a target combination length of the target combination conversion result information;

(2) a second acquisition module 604, configured to acquire an intermediate state set matching the target combination length, each intermediate state in the intermediate state set being separately used for controlling the conversion to obtain one piece of conversion result information, the intermediate state set including a first target intermediate state used for controlling the conversion to obtain the target conversion result information, and the first target intermediate state being located at a second target position in the intermediate state set; and (3) a third acquisition module 606, configured to obtain the target conversion result information by using the first target intermediate state determined from the intermediate state set.

Optionally, in this embodiment, the target combination length may be, but is not limited to, a result length of target combination conversion result information after conversion. For example, conversion of text information is used as an example. The combination length may be, but is not limited to, a quantity of words in a phrase. The foregoing description is merely an example, and is not meant to be limited in this embodiment in any manner.

The target combination length of the target combination conversion result information may be the same as a combination length of a source information object combination. For example, as shown in FIG. 4, a source information object combination of "A g" which has two words corresponds to a target combination conversion result information "Y1 Y07", which also has two words. On the other hand, the target combination length of the target combination conversion result information may be different from a combination length of a source information object combination. For example, as shown in FIG. 4, a source information object combination of "A Bb T" which has four words may correspond to a target combination conversion result information "Y2Y02 Y20", which has four words, or a target combination conversion result information "Y1 Y2Y02 Y Y", which has five words. There is no limitation in any manner in this embodiment.

Specifically, descriptions are provided with reference to FIG. 4. Assuming that the source information to be converted is "A Bb Ddd hh", target combination conversion result information of "Y1 Y2Y02 Y4 Y04Y04" corresponding to a target source information object combination of "A Bb Ddd" is found in the preconfigured mapping list, where a target combination length indicates that a quantity of words is 6, an intermediate state set matching the target combination length may then be acquired. According to the foregoing example, an intermediate state set may include 6 intermediate states (also referred to as hidden states), and may include: Hi, H(i+1), H(i+2), H(i+3), H(i+4), and H(i+5).

The second target position and the first target position may indicate positions in the same order. For example, assuming that a currently determined target source information object is "A", the target source information object "A" being located at a position of the first object in a target source information object combination, then the first target intermediate state may correspond to the hidden state Hi which is also located at a first position of the intermediate state set.

In other words, from the hidden state Hi to the hidden state H(i+5), during an information conversion process, information conversion can all be performed according to target combination conversion result information of "Y1 Y2Y02 Y4 Y04Y04" which is found while performing hidden state Hi conversion, and a prediction result that is based on a neural network model is blocked. A result obtained through machine translation by the neural network model is used together with the preconfigured mapping list and is no longer used separately.

The information conversion apparatus determines from the intermediate state set that the first target intermediate state is the hidden state Hi, and correspondingly determines that the target conversion result information is "Y1", which is in the target combination conversion result information "Y1 Y2Y02 Y4 Y04Y04".

In this embodiment provided by this application, overall information conversion of a source information object combination is controlled by using a target combination length of found target combination conversion result information, so as to implement intervention in an information conversion process by using a preconfigured mapping list, to directly acquire the target combination conversion result information through searching the preconfigured mapping list and reduce the additional time required for repeated training of a neural network model in the information conversion process, thus achieving the effect of improving the speed and efficiency of information conversion.

In an optional solution, the conversion unit 510 further includes:
(1) a first determination module, configured to determine, after the target conversion result information is acquired by using the first target intermediate state determined from the intermediate state set, a second target intermediate state used for controlling the conversion to obtain next target conversion result information; and
(2) a fourth acquisition module, configured to acquire the next target conversion result information according to the target combination conversion result information if the second target intermediate state belongs to the intermediate state set.

Optionally, in this embodiment, the fourth acquisition module includes: an acquisition submodule, configured to acquire from the target combination conversion result information, and next to the target conversion result information corresponding to the first target intermediate state, next conversion result information to be used as the next target conversion result information corresponding to the second target intermediate state.

Specifically, descriptions are provided with reference to FIG. 3. Assuming that conversion on a target source information object corresponding to the first target intermediate state (for example, the hidden state Hi) is completed, a next intermediate state, that is, the second target intermediate state (for example, the hidden state H(i+1)) is acquired, and it is determined whether the hidden state H(i+1) belongs to the intermediate state set. It can be learned from the foregoing example that if the hidden state H(i+1) belongs to the intermediate state set, next conversion result information can then be acquired from the target combination conversion result information of "Y1 Y2Y02 Y4 Y04Y04" subsequent to the target conversion result information (for example, "Y1") corresponding to the first target intermediate state (for example, the hidden state Hi) to be used as the next target conversion result information, for example, "Y2", corresponding to the second target intermediate state (for example, the hidden state H(i+1)).

The manners of determining whether the second target intermediate state belongs to the intermediate state set may include, but are not limited to: counting, from the first target intermediate state, intermediate states used in subsequent conversion in a case that a counting result does not reach a quantity of intermediate states included in the intermediate state set, target combination conversion result information that is found from the preconfigured mapping list may be directly used for completing information conversion; and if a counting result exceeds a quantity of intermediate states included in the intermediate state set, the steps of performing search and conversion are repeated according to the foregoing embodiment.

Optionally, in this embodiment, that in a case that a counting result exceeds a quantity of intermediate states included in the intermediate state set, the steps of performing search and conversion are performed again according to the foregoing embodiment may include, but is not limited to, after the second target intermediate state used for controlling the conversion to acquire the next target conversion result information is determined in a case that the second target intermediate state does not belong to the intermediate state set, searching the preconfigured mapping list again for a next target source information object combination by using a first search module, the next target source information object combination including a next target source information object needing to be converted.

In other words, if the second target intermediate state does not belong to the intermediate state set, the step may, but is not limited to, search the preconfigured mapping list again for the target combination conversion result information according to the method described in the foregoing embodiment, to continue with the information conversion process, until conversion on the source information is completed.

In this embodiment, it is determined, according to a determination result about whether the next intermediate state belongs to the intermediate state set, whether to directly use target combination conversion result information that is found from the preconfigured mapping list to complete information conversion, thus achieving the effect of improving the speed and efficiency of information conversion.

In an optional solution, the conversion unit 510 further includes:

(1) a fifth acquisition module, configured to: after the second target intermediate state used for controlling the conversion to obtain the next target conversion result information is determined, acquire a quantity of intermediate states on which the first target intermediate state superimposes the second target intermediate state; and (2) a second determination module, configured to: determine that the second target intermediate state belongs to the intermediate state set if the quantity of intermediate states is less than or equal to the target combination length, and determine that the second target intermediate state does not belong to the intermediate state set if the quantity of intermediate states is greater than the target combination length.

Optionally, in this embodiment, the step may be, but is not limited to, counting, from the first target intermediate state, intermediate states used in subsequent conversion, to determine whether the second target intermediate state belongs to the intermediate state set.

Specifically, descriptions are provided with reference to the following example. The intermediate states are counted and it is assumed that a quantity of intermediate states after the second target intermediate state is superposed is T. Further, it is also assumed that the target combination length is 6. If that the quantity T of intermediate states is less than or equal to 6, it indicates that the second target intermediate state belongs to the intermediate state set, so that the target combination conversion result information found in a previous time can be directly used to perform information conversion. If the quantity T of intermediate states is greater than 6, it indicates that the second target intermediate state does not belong to the intermediate state set, and the steps of performing search and conversion need to be repeated.

In this embodiment provided in this application, the intermediate states are counted, so that target combination conversion result information is accurately used to perform information conversion on the source information object combination, thereby avoiding a conversion error.

In an optional solution, the search unit 506 includes:

(1) a sixth acquisition module, configured to acquire, from the preconfigured mapping list according to the target source information object, a source information object combination set included in the source information, the target source information object being located at the first target position in each source information object combination in the source information object combination set; and (2) a second search module, configured to search the source information object combination set for a source information object combination with the largest source combination length to be used as the target source information object combination.

Specifically, descriptions are provided with reference to FIG. 4. Assuming that the source information to be converted is "A Bb Ddd hh", the preconfigured mapping list is searched for a source information object combination set using a target source information object "A" as the first object. If a found source information object combination set includes: "A Bb D", "A Bb Ddd", and "A Bb", where a source information object combination having the largest source combination length is "A Bb Ddd", then "A Bb Ddd" may be used as the target source information object combination.

In this embodiment provided in this application, the source information object combination set is searched for the source information object combination with the largest source combination length, the target source information object being located at the first target position in each source information object combination of the source information object combination set, thus using as much as possible mapping relationships already recorded in the preconfigured mapping list to complete information conversion and reduce the duration for machine translation by a neural network model, therefore achieving the object of improving the efficiency and speed of information conversion.

In an optional solution, the first determination unit includes:

(1) a seventh acquisition module, configured to acquire previous conversion result information from the historical conversion result information;

(2) an eighth acquisition module, configured to acquire a target source information object vector from the source information vector sequence according to the source information vector sequence and the previous conversion result information; and (3) a third determination module, configured to determine the target source information object according to the target source information object vector.

Specifically, descriptions are provided with reference to FIG. 3. Assuming that an acquired source information vector sequence corresponding to source information to be converted is: X1X2X3 . . . Xt, it is determined, according to the source information vector sequence and a hidden state H(i−1) of a previous source information object on which conversion is completed, that a weight a2 corresponding to a source information object vector X2 has the greatest weight impact on a hidden state Hi corresponding to the target source information object currently needing to be converted. Therefore, it can be predicted that the target source information object is a source information object corresponding to the vector X2.

In this embodiment, according to the source information vector sequence and previous conversion result information, a target source information vector needing to be acquired can be accurately predicted from the source information vector sequence corresponding to the source information. The target source information object is then determined according to the target source information vector.

According to still another aspect of the embodiments of this application, a storage medium is further provided. The storage medium stores a computer program, the computer program being configured to perform steps in any one of the method embodiments when being run.

Optionally, in this embodiment, the storage medium may be configured to store a computer program used for performing the following steps:

S1: acquiring a source information vector sequence corresponding to source information to be converted, the source information vector sequence including: source information object vectors corresponding to source information objects included in the source information;

S2: sequentially determining, according to the source information vector sequence and historical conversion result information, a target source information object needing to be converted, the historical conversion result information being conversion result information corresponding to source information objects on which conversion is completed;

S3: searching a preconfigured mapping list for a target source information object combination included in the source information, the target source information object being located at a first target position in the target source information object combination, and the preconfigured mapping list being used for recording mapping relationships between source information object combinations and combination conversion result information;

S4: acquiring target combination conversion result information corresponding to the target source information object combination from the preconfigured mapping list in a case that the target source information object combination is found; and S5: acquiring, according to the target combination conversion result information, target conversion result information corresponding to the target source information object.

Optionally, the storage medium is configured to store a computer program which is configured to perform the following steps:

S1: acquiring a target combination length of the target combination conversion result information;

S2: acquiring an intermediate state set matching the target combination length, each intermediate state in the intermediate state set being separately used for controlling the conversion to obtain one piece of conversion result information, the intermediate state set including a first target intermediate state used for controlling the conversion to obtain the target conversion result information, and the first target intermediate state being located at a second target position in the intermediate state set; and S3: acquiring the target conversion result information by using the first target intermediate state determined from the intermediate state set.

Optionally, the storage medium is configured to store a computer program which is configured to perform the following steps:

S1: determining a second target intermediate state used for controlling the conversion to obtain next target conversion result information; and S2: acquiring the next target conversion result information according to the target combination conversion result information if the second target intermediate state belongs to the intermediate state set.

Optionally, the storage medium is configured to store a computer program which is configured to perform the following steps:

S1: acquiring from the target combination conversion result information, and next to the target conversion result information corresponding to the first target intermediate state, next conversion result information to be used as the next target conversion result information corresponding to the second target intermediate state.

Optionally, the storage medium is configured to store a computer program which is configured to perform the following steps:

S1: searching the preconfigured mapping list again for a next target source information object combination if the second target intermediate state does not belong to the intermediate state set, the next target source information object combination including a next target source information object needing to be converted.

Optionally, the storage medium is configured to store a computer program which is configured to perform the following steps:

S1: acquiring a quantity of intermediate states on which the first target intermediate state superimposes the second target intermediate state;

S2: determining that the second target intermediate state belongs to the intermediate state set if the quantity of intermediate states is less than or equal to the target combination length; and S3: determining that the second target intermediate state does not belong to the intermediate state set if the quantity of intermediate states is greater than the target combination length.

Optionally, the storage medium is configured to store a computer program which is configured to perform the following steps:

S1: acquiring, from the preconfigured mapping list according to the target source information object, a source information object combination set included in the source information, the target source information object being located at the first target position in each source information object combination in the source information object combination set; and S2: searching the source information object combination set for a source information object combination with the largest source combination length to be used as the target source information object combination.

Optionally, the storage medium is configured to store a computer program which is configured to perform the following steps:

S1: acquiring previous conversion result information from the historical conversion result information;

S2: acquiring a target source information object vector from the source information vector sequence according to the source information vector sequence and the previous conversion result information; and S3: determining the target source information object according to the target source information object vector.

Optionally, the storage medium may be further configured to store a computer program which is configured to perform the steps included in the method in the embodiments, and is not described again in this embodiment.

Optionally, in this embodiment, a person of ordinary skill in the art may understand that all or part of the steps of the methods in the embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, an optical disc, and the like.

Figure 7:
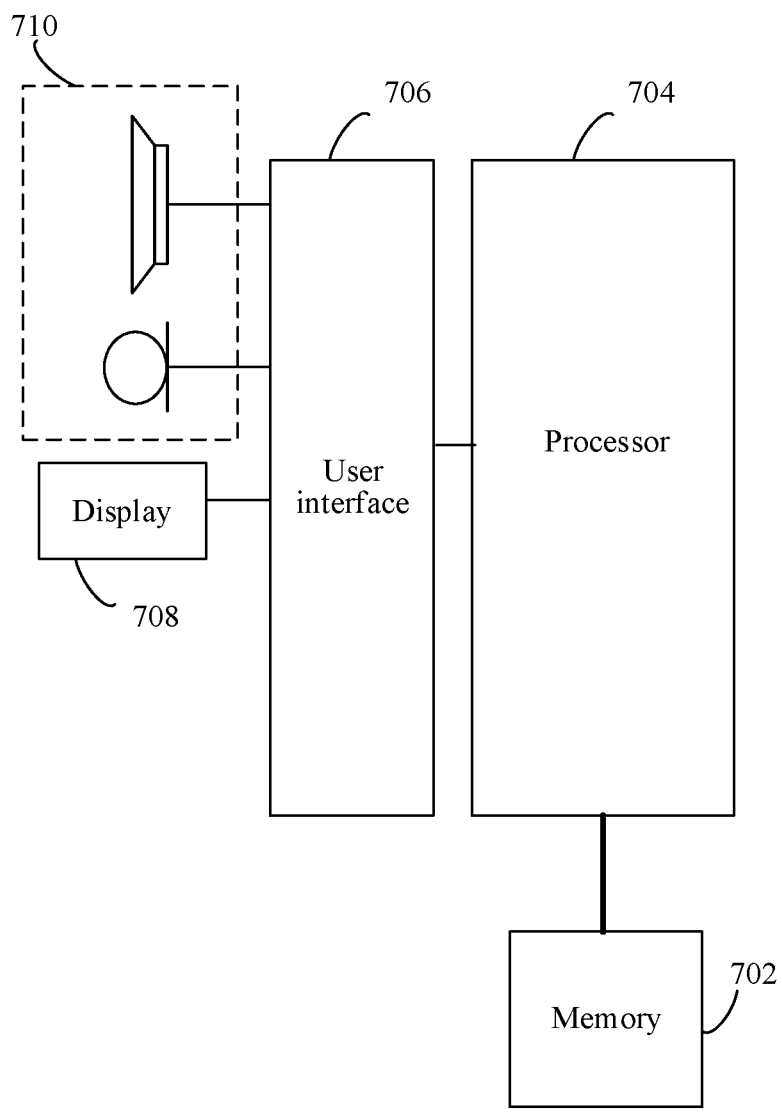
FIG. 7 is a schematic diagram of an exemplary electronic apparatus according to an embodiment of this application.

According to still another aspect of the embodiments of this application, an electronic apparatus configured to implement the foregoing information conversion method is further provided. As shown in FIG. 7, the electronic apparatus includes a memory 702, a processor 704, a display 708, a transmission apparatus 710, and a user interface 706 configured to connect the processor 704, the display 708, and the transmission apparatus 710.

Optionally, in this embodiment, the electronic apparatus may be located in at least one of a plurality of network devices in a computer network.

Optionally, in this embodiment, the processor may be configured to perform the following steps by using a computer program:

S1: acquiring a source information vector sequence corresponding to source information to be converted, the source information vector sequence including: source information object vectors corresponding to source information objects included in the source information;

S2: sequentially determining, according to the source information vector sequence and historical conversion result information, a target source information object needing to be converted, the historical conversion result information being conversion result information corresponding to source information objects on which conversion is completed;

S3: searching a preconfigured mapping list for a target source information object combination included in the source information, the target source information object being located at a first target position in the target source information object combination, and the preconfigured mapping list being used for recording mapping relationships between source information object combinations and combination conversion result information;

S4: acquiring target combination conversion result information corresponding to the target source information object combination from the preconfigured mapping list in a case that the target source information object combination is found; and S5: acquiring, according to the target combination conversion result information, target conversion result information corresponding to the target source information object.

Optionally, a person of ordinary skill in the art may understand that, the structure shown in FIG. 7 is only for illustrative purpose. The electronic apparatus may be a terminal device such as a smartphone (for example, an Android mobile phone or an iOS mobile phone), a tablet computer, a laptop computer, a mobile Internet device (MID) or a PAD. FIG. 7 does not constitute a limitation on the structure of the foregoing electronic apparatus. For example, the electronic apparatus may further include more or fewer components (such as a network interface) than those shown in FIG. 7, or has a configuration different from that shown in FIG. 7.

The memory 702 may be configured to store a software program and module, such as a program instruction/module corresponding to the information conversion method and the apparatus in the embodiments of this application. The processor 704 runs the software program and module stored in the memory 702, to perform various functional applications and data processing, that is, implement the information conversion method described above. The memory 702 may include a high speed random access memory, and may further include a non-volatile memory, for example, one or more magnetic storage apparatuses, a flash memory, or another non-volatile solid-state memory. In some examples, the memory 702 may further include memories remotely disposed relative to the processor 704, and these remote memories may be connected to the terminal through a network. Examples of the network include but are not limited to, the Internet, an intranet, a local area network, a mobile communications network, and a combination thereof.

The transmission apparatus 710 is configured to receive or send data by using a network. Specific examples of the foregoing network may include a wired network and a wireless network. In an example, the transmission apparatus 710 includes a network interface controller (NIC), which may be connected to another network device and router by using a cable, so as to communicate with the Internet or a local area network. In an example, the transmission apparatus 710 is a radio frequency (RF) module, which communicates with the Internet in a wireless manner.

Specifically, the memory 702 is configured to store source information, a mapping list, conversion result information, and the like. A user interface 706 is configured to acquire source information, and a display 708 is configured to display conversion result information. The foregoing description is merely an example, and this is not limited in any manner in this embodiment.

The sequence numbers of the foregoing embodiments of this application are merely for description purpose, and do not indicate the preference among the embodiments.

When the integrated unit in the foregoing embodiments is implemented in the form of a software functional unit and sold or used as an independent product, the integrated unit may be stored in the foregoing computer-readable storage medium. Based on such understanding, the technical solutions of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have their respective focuses. For a part that is not described in detail in an embodiment, refer to related descriptions in other embodiments.

In the several embodiments provided in this application, it is to be understood that the disclosed client may be implemented in other manners. For example, the described apparatus embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely optional implementations of this application. A person of ordinary skill in the art may make improvements and refinements without departing from the principle of this application. All such modifications and refinements shall fall within the protection scope of this application.

INDUSTRIAL APPLICABILITY

In this application, a preconfigured mapping list is introduced into an information conversion process from outside. The preconfigured mapping list is searched for target combination conversion result information corresponding to a target source information object combination included in source information, and the mapping relationships between source information object combinations and combination conversion result information recorded in the preconfigured mapping list is used to intervene in and adjust information conversion on the source information. By introducing the preconfigured mapping list from outside, a quick adjustment can be achieved, since it is no longer necessary to spend a lot of time and computing resources to train a neural network model required for information conversion again, thus achieving the effects of updating to a new mapping relationship required for information conversion quickly and improving the flexibility of information conversion.

What is claimed is:

1. An information conversion method, comprising:
   acquiring, by a hardware device, a source information vector sequence corresponding to source information to be converted, the source information vector sequence comprising: source information object vectors corresponding to source information objects comprised in the source information;
   sequentially determining using iteration, by the hardware device, according to the source information vector sequence, a weight factor corresponding to a source information object vector in the source information vector sequence, and historical conversion information, a target source information object needing to be converted, wherein the weight factor has a greatest weight impact on a current hidden state;
   searching, by the hardware device, a preconfigured mapping list for a target source information object combination comprised in the source information, wherein the target source information object is located at a first target position in the target source information object combination, and the preconfigured mapping list is used for recording mapping relationships between source information object combinations and combination conversion result information, and wherein the mapping relationships are predefined and fixed in the preconfigured mapping list;
   acquiring, by the hardware device, target combination conversion result information corresponding to the target source information object combination from the preconfigured mapping list if the target source information object combination is found;
   acquiring, by the hardware device according to the target combination conversion result information, target conversion result information corresponding to the target source information object; and
   modifying the current hidden state based on the target conversion result information.

2. The method according to claim 1, wherein the acquiring, by the hardware device according to the target combination conversion result information, target conversion result information corresponding to the target source information object comprises:
   acquiring, by the hardware device, a target combination length of the target combination conversion result information;
   acquiring, by the hardware device, an intermediate state set matching the target combination length, wherein each intermediate state in the intermediate state set is separately used for controlling the conversion to obtain one piece of conversion result information, the intermediate state set comprising a first target intermediate state used for controlling the conversion to obtain the target conversion result information, and the first target intermediate state is located at a second target position in the intermediate state set; and
   acquiring, by the hardware device, the target conversion result information by using the first target intermediate state determined from the intermediate state set.

3. The method according to claim 2, after the acquiring, by the hardware device, the target conversion result information by using the first target intermediate state determined from the intermediate state set, further comprising:
   determining, by the hardware device, a second target intermediate state used for controlling the conversion to obtain next target conversion result information; and
   acquiring, by the hardware device, the next target conversion result information according to the target combination conversion result information if the second target intermediate state belongs to the intermediate state set.

4. The method according to claim 3, wherein the acquiring, by the hardware device, the next target conversion result information according to the target combination conversion result information if the second target intermediate state belongs to the intermediate state set comprises:
   acquiring, by the hardware device, from the target combination conversion result information, and next to the target conversion result information corresponding to the first target intermediate state, next conversion result information to be used as the next target conversion result information corresponding to the second target intermediate state.

5. The method according to claim 3, after the determining, by the hardware device, a second target intermediate state used for controlling the conversion to obtain next target conversion result information, further comprising:
   Searching again, by the hardware device, the preconfigured mapping list for a next target source information object combination if the second target intermediate state does not belong to the intermediate state set, wherein the next target source information object combination comprises a next target source information object needing to be converted.

6. The method according to claim 3, after the determining, by the hardware device, a second target intermediate state used for controlling the conversion to obtain next target conversion result information, further comprising:
   acquiring, by the hardware device, a quantity of intermediate states on which the first target intermediate state superimposes the second target intermediate state;
   determining, by the hardware device, that the second target intermediate state belongs to the intermediate state set if the quantity of intermediate states is less than or equal to the target combination length; and
   determining, by the hardware device, that the second target intermediate state does not belong to the intermediate state set if the quantity of intermediate states is greater than the target combination length.

7. The method according to claim 1, wherein the searching, by the hardware device, a preconfigured mapping list for a target source information object combination comprised in the source information comprises:
acquiring, by the hardware device from the preconfigured mapping list according to the target source information object, a source information object combination set included in the source information, wherein the target source information object is located at the first target position in each source information object combination in the source information object combination set; and
searching, by the hardware device, the source information object combination set for a source information object combination with a largest source combination length to be used as the target source information object combination.

8. The method according to claim 1, wherein the sequentially determining, by the hardware device according to the source information vector sequence and historical conversion result information, a target source information object needing to be converted comprises:
acquiring, by the hardware device, previous conversion result information from the historical conversion result information;
acquiring, by the hardware device, a target source information object vector from the source information vector sequence according to the source information vector sequence and the previous conversion result information; and
determining, by the hardware device, the target source information object according to the target source information object vector.

9. An apparatus for information conversion, comprising a memory for storing computer readable instructions and a processor in communication with the memory, wherein the processor is configured to execute the computer readable instructions to cause the apparatus to:
acquire a source information vector sequence corresponding to source information to be converted, wherein the source information vector sequence comprises: source information object vectors corresponding to source information objects comprised in the source information;
sequentially determine using iteration, by the hardware device, according to the source information vector sequence, a weight factor corresponding to a source information object vector in the source information vector sequence, and historical conversion information, a target source information object needing to be converted, wherein the weight factor has a greatest weight impact on a current hidden state;
search a preconfigured mapping list for a target source information object combination comprised in the source information, wherein the target source information object is located at a first target position in the target source information object combination, and the preconfigured mapping list is used for recording mapping relationships between source information object combinations and combination conversion result information, and wherein the mapping relationships are predefined and fixed in the preconfigured mapping list;
acquire target combination conversion result information corresponding to the target source information object combination from the preconfigured mapping list if the target source information object combination is found;
acquire, according to the target combination conversion result information, target conversion result information corresponding to the target source information object; and
modify the current hidden state based on the target conversion result information.

10. The apparatus according to claim 9, wherein the processor, when executing the computer readable instructions to cause the apparatus to acquire, according to the target combination conversion result information, target conversion result information corresponding to the target source information object, is configured to cause the apparatus to:
acquire a target combination length of the target combination conversion result information;
acquire an intermediate state set matching the target combination length, wherein each intermediate state in the intermediate state set is separately used for controlling the conversion to obtain one piece of conversion result information, the intermediate state set comprising a first target intermediate state used for controlling the conversion to obtain the target conversion result information, and the first target intermediate state is located at a second target position in the intermediate state set; and
acquire the target conversion result information by using the first target intermediate state determined from the intermediate state set.

11. The apparatus according to claim 10, wherein the processor, after executing the computer readable instructions to cause the apparatus to acquire the target conversion result information by using the first target intermediate state determined from the intermediate state set, is configured to cause the apparatus to:
determine a second target intermediate state used for controlling the conversion to obtain next target conversion result information; and
acquire the next target conversion result information according to the target combination conversion result information if the second target intermediate state belongs to the intermediate state set.

12. The apparatus according to claim 11, wherein the processor, when executing the computer readable instructions to cause the apparatus to acquire the next target conversion result information according to the target combination conversion result information if the second target intermediate state belongs to the intermediate state set, is configured to cause the apparatus to:
acquire, from the target combination conversion result information, and next to the target conversion result information corresponding to the first target intermediate state, next conversion result information to be used as the next target conversion result information corresponding to the second target intermediate state.

13. The apparatus according to claim 11, wherein the processor, after executing the computer readable instructions to cause the apparatus to determine a second target intermediate state used for controlling the conversion to obtain next target conversion result information, is configured to cause the apparatus to:
search the preconfigured mapping list again for a next target source information object combination if the second target intermediate state does not belong to the intermediate state set, wherein the next target source information object combination comprises a next target source information object needing to be converted.

14. The apparatus according to claim 11, wherein the processor, after executing the computer readable instructions to cause the apparatus to determine a second target intermediate state used for controlling the conversion to obtain next target conversion result information, is configured to cause the apparatus to:
acquire a quantity of intermediate states on which the first target intermediate state superimposes the second target intermediate state;
determine that the second target intermediate state belongs to the intermediate state set if the quantity of intermediate states is less than or equal to the target combination length; and
determine that the second target intermediate state does not belong to the intermediate state set if the quantity of intermediate states is greater than the target combination length.

15. The apparatus according to claim 9, wherein the processor, when executing the computer readable instructions to cause the apparatus to search a preconfigured mapping list for a target source information object combination comprised in the source information, is configured to cause the apparatus to:
acquire, from the preconfigured mapping list according to the target source information object, a source information object combination set included in the source information, wherein the target source information object is located at the first target position in each source information object combination in the source information object combination set; and
search the source information object combination set for a source information object combination with a largest source combination length to be used as the target source information object combination.

16. The apparatus according to claim 9, wherein the processor, when executing the computer readable instructions to cause the apparatus to sequentially determine, according to the source information vector sequence and historical conversion result information, a target source information object needing to be converted, is configured to cause the apparatus to:
acquire previous conversion result information from the historical conversion result information;
acquire a target source information object vector from the source information vector sequence according to the source information vector sequence and the previous conversion result information; and
acquire the target source information object according to the target source information object vector.

17. A non-transitory storage medium for storing computer readable instructions, the computer readable instructions, when executed by one or more processors, causing the one or more processors to:
acquire a source information vector sequence corresponding to source information to be converted, wherein the source information vector sequence comprises: source information object vectors corresponding to source information objects comprised in the source information;
sequentially determine using iteration, by the hardware device, according to the source information vector sequence, a weight factor corresponding to a source information object vector in the source information vector sequence, and historical conversion information, a target source information object needing to be converted, wherein the weight factor has a greatest weight impact on a current hidden state;
search a preconfigured mapping list for a target source information object combination comprised in the source information, wherein the target source information object is located at a first target position in the target source information object combination, and the preconfigured mapping list is used for recording mapping relationships between source information object combinations and combination conversion result information, and wherein the mapping relationships are predefined and fixed in the preconfigured mapping list;
acquire target combination conversion result information corresponding to the target source information object combination from the preconfigured mapping list if the target source information object combination is found;
acquire, according to the target combination conversion result information, target conversion result information corresponding to the target source information object; and
modify the current hidden state based on the target conversion result information.

18. The non-transitory storage medium according to claim 17, wherein, when the computer readable instructions cause the one or more processors to acquire, according to the target combination conversion result information, target conversion result information corresponding to the target source information object, the computer readable instructions cause the one or more processors to:
acquire a target combination length of the target combination conversion result information;
acquire an intermediate state set matching the target combination length, wherein each intermediate state in the intermediate state set is separately used for controlling the conversion to obtain one piece of conversion result information, the intermediate state set comprising a first target intermediate state used for controlling the conversion to obtain the target conversion result information, and the first target intermediate state is located at a second target position in the intermediate state set; and
acquire the target conversion result information by using the first target intermediate state determined from the intermediate state set.

19. The non-transitory storage medium according to claim 18, wherein, after the computer readable instructions cause the one or more processors to acquire the target conversion result information by using the first target intermediate state determined from the intermediate state set, the computer readable instructions cause the one or more processors to:
determine a second target intermediate state used for controlling the conversion to obtain next target conversion result information; and
acquire the next target conversion result information according to the target combination conversion result information if the second target intermediate state belongs to the intermediate state set.

20. The non-transitory storage medium according to claim 19, wherein, when the computer readable instructions cause the one or more processors to acquire the next target conversion result information according to the target combination conversion result information if the second target intermediate state belongs to the intermediate state set, the computer readable instructions cause the one or more processors to:
acquire, from the target combination conversion result information, and next to the target conversion result information corresponding to the first target intermediate state, next conversion result information to be used as the next target conversion result information corresponding to the second target intermediate state.

\* \* \* \* \*